United States Patent
Koep et al.

(10) Patent No.: US 11,155,491 B2
(45) Date of Patent: Oct. 26, 2021

(54) MULTIPURPOSE SOLUTION FOR STRENGTHENING AND SURFACE MODIFICATION OF GLASS SUBSTRATES

(71) Applicant: C-Bond Systems, LLC, Houston, TX (US)

(72) Inventors: Erik K. Koep, Houston, TX (US); Jason M. Rothenberger, Ancaster (CA); Carmen M. Fernandez-Posada, Swansea (GB); Vince Pugliese, Southlake, TX (US); Andrew R. Barron, Swansea (GB); Bruce E. Rich, Houston, TX (US)

(73) Assignee: C-Bond Systems, LLC, Houston, TX (US)

(*) Notice: Subject to any disclaimer, the term of this patent is extended or adjusted under 35 U.S.C. 154(b) by 0 days.

(21) Appl. No.: 16/376,944

(22) Filed: Apr. 5, 2019

(65) Prior Publication Data

US 2019/0308904 A1    Oct. 10, 2019

Related U.S. Application Data

(60) Provisional application No. 62/653,658, filed on Apr. 6, 2018.

(51) Int. Cl.
| | |
|---|---|
| C03C 17/30 | (2006.01) |
| C03C 17/00 | (2006.01) |
| C03C 17/32 | (2006.01) |
| C09D 133/08 | (2006.01) |
| C08K 5/5435 | (2006.01) |
| C09D 5/00 | (2006.01) |

(52) U.S. Cl.
CPC ............ *C03C 17/30* (2013.01); *C03C 17/008* (2013.01); *C03C 17/32* (2013.01); *C08K 5/5435* (2013.01); *C09D 5/00* (2013.01); *C09D 133/08* (2013.01); *C03C 2217/76* (2013.01); *C03C 2217/78* (2013.01)

(58) Field of Classification Search
CPC ....... C03C 17/30; C03C 17/008; C03C 17/32; C03C 2217/76; C08K 5/5435; C09D 5/00; C09D 133/08
USPC ............ 106/287.35, 287.12, 287.13, 287.16
See application file for complete search history.

(56) References Cited

U.S. PATENT DOCUMENTS

| | | | | |
|---|---|---|---|---|
| 2,723,211 | A * | 11/1955 | Macmullen | C03C 25/40 427/387 |
| 5,672,428 | A * | 9/1997 | Muschelweicz | C09D 183/04 428/352 |
| 8,343,601 | B1 * | 1/2013 | Ekin | A47G 19/22 428/34.7 |

(Continued)

OTHER PUBLICATIONS

International Search Report and Written Opinion dated Jun. 28, 2019 in International Patent Application No. PCT/US2019/026130.

*Primary Examiner* — Patricia L. Hailey
(74) *Attorney, Agent, or Firm* — Stroock & Stroock & Lavan LLP

(57) ABSTRACT

Disclosed herein are a composition and one-step method of strengthening glass without heat or chemical processing of the glass itself, while also modifying the surface for improved surface properties. The multifunctional composition is a liquid that can be applied at room temperature and pressure as a topical coating on glass as well as other brittle materials.

6 Claims, 3 Drawing Sheets

(56) References Cited

U.S. PATENT DOCUMENTS

| | | | |
|---|---|---|---|
| 2012/0003485 A1* | 1/2012 | Habich | H01L 51/5088 |
| | | | 428/447 |
| 2013/0302594 A1* | 11/2013 | Sugiyama | C08F 292/00 |
| | | | 428/323 |
| 2014/0220327 A1 | 8/2014 | Adib et al. | |
| 2015/0056412 A1* | 2/2015 | Yu | B05D 3/107 |
| | | | 428/147 |
| 2015/0243858 A1* | 8/2015 | Okawa | H01L 33/502 |
| | | | 252/301.35 |
| 2015/0375475 A1 | 12/2015 | Cook | |
| 2016/0046823 A1 | 2/2016 | Barrera et al. | |
| 2016/0083835 A1* | 3/2016 | Adib | C23C 16/308 |
| | | | 428/332 |
| 2016/0145449 A1* | 5/2016 | Hilgers | C09D 4/00 |
| | | | 428/327 |
| 2020/0325359 A1* | 10/2020 | Veit | C09D 5/00 |

* cited by examiner

MULTIPURPOSE SOLUTION FOR STRENGTHENING AND SURFACE MODIFICATION OF GLASS SUBSTRATES

CROSS-REFERENCE TO RELATED APPLICATIONS

This application claims the benefit of U.S. Provisional Application No. 62/653,658, filed on Apr. 6, 2018, which is incorporated by reference herein in its entirety.

BACKGROUND

Articles having hydrophobic and/or oleophobic surfaces have a number of commercially important features. For example, hydrophobic and/or oleophobic surfaces can easily stay clean. In addition, hydrophobic and/or oleophobic surfaces are significant in fluidics, particularly when trying to decrease flow resistance of channels. Many topical treatments for inducing hydrophobic behavior on glass, particularly automotive windscreens, are commercially available. However, despite all the advances in the art, there remains a need for reliable methods that are effective to produce hydrophobic and/or oleophobic surfaces in a commercial setting.

Articles having improved scratch or abrasion resistance are also commercially important. Attempts to improve scratch or abrasion resistance typically include manipulating the composition of the glass itself to increase hardness, use of alternate materials, or applying hard coatings to the glass surface. However, in most instances cost, poor scalability, and/or loss of transparency make such approaches unsuitable for large area glass applications.

Brittle materials are generally understood to have low fracture toughness. Glass has the drawback of being brittle. Such brittleness leads to breakage, cracking and chipping, all of which are particularly problematic in applications such as automotive windscreens, mobile electronic touch screens, displays, watch crystals, solar concentrators, windows, containers, and the like. Glass compositions having higher toughness are less brittle, resist crack propagation, and are less prone to other types of damage, such as chipping. The fracture toughness of glass can be improved through the judicious use of heat. Well-understood mechanisms of glass toughening, such as annealing and tempering, can be effective, but add cost and may not be applicable to all glass and brittle material applications. Moreover, thermal or ion-exchange mechanisms cannot be retrofitted for aftermarket applications.

SUMMARY

Various embodiments of the present invention provide compositions for strengthening and surface modification of brittle materials, and methods for making and using said compositions. In particular, the present invention provides a multipurpose solution for one-step treatment of brittle materials that both modifies the surface behavior and increases the resistance of the underlying material to fracture. The disclosure herein refers primarily to glass surfaces, but the present invention can be applied to a wide variety of brittle materials.

Embodiments of the present invention can improve properties of brittle materials, such as strength, impact resistance, sustainability, protection level, and structural integrity. The present invention imparts additional fracture toughness to brittle materials without the use of heat treatment, and therefore can be applied after manufacture is complete.

Moreover, embodiments of the present invention can also modify the surface of brittle materials to induce changes in the contact angle of various liquids with the treated surface. Surface modification can take many forms including, but not limited to, changes in hydrophobicity, hydrophilicity, scratch resistance, surface energy, surface charge, and surface reactivity. Surface modification can impart specific properties to the surface. For example, surface modification can be performed to alter the natural contact angle between water and a glass surface. In other embodiments, surface modification can be performed to impart additional scratch resistance.

Embodiments of the present invention provide a multifunctional liquid solution that can be applied at room temperature and pressure as a topical coating on brittle materials, especially glass. The solution increases the fracture toughness of the underlying material by at least 10% while also modifying the surface characteristics in a quantifiable way. In certain illustrative embodiments, the surface is modified to provide hydrophobic and/or oleophobic surface characteristics.

While designed for the automotive industry for use on windshields, the present invention has applications in a variety of areas, such as, but not limited to, architectural glass, where the self-cleaning properties of hydrophobic coatings can be of use. Commercially-available hydrophobic products do little to address the underlying resistance of the glass to impact. Embodiments of the present invention provide a coating solution that both strengthens the underlying glass while also inducing a larger contact angle for water on the treated glass.

In some embodiments, the invention provides multifunctional composition for modifying one or more surface properties and increasing strength of a glass substrate, the composition comprising: a glass-strengthening component; a surface-modification component; and an aqueous solvent, the glass-strengthening component comprising a strengthening emulsion of colloidal particles comprising at least one organo-silicon compound, at least one dispersible polymer, and at least one polyol, and the surface-modification component comprising at least one of a water-soluble wax, a branched alkyl-silane, a fluorinated branched alkyl-silane, a linear alkyl-silane, a dipodal silane, and a methyl-silane, wherein the composition is formulated for one-step application to the glass substrate at room temperature and pressure, and wherein the composition, when applied to the glass substrate, provides at least 10% improvement in the strength of the glass substrate as compared to untreated glass, as measured by ring on ring strength testing according to ASTM C1499.

In some embodiments, the organo-silicon compound is a bi-functional organo-silicon compound.

In some embodiments, the organo-silicon compound comprises at least one of (3,3-dimethylbutyl)triethoxysilane, (3-glycidoxypropyl)trimethoxysilane, 1,2-bis(methyldiethoxysilyl)ethane, and N-(2-aminoethyl)-3-aminopropylsilanetriol.

In some embodiments, the dispersible polymer comprises at least one of an acrylic polymer, an epoxy polymer, a urethane polymer or a polysulfide, a polyether siloxane, and an aliphatic polyester.

In some embodiments, the polyol comprises at least one of glycerol, pentaerythritol, ethylene glycol, and sucrose.

In some embodiments, the surface properties of the glass substrate comprise at least one of hydrophobicity and scratch resistance.

Additional features and advantages of embodiments of the present invention are described further below. This summary section is meant merely to illustrate certain features of the invention, and is not meant to limit the scope of the invention in any way. The failure to discuss a specific feature or embodiment of the invention, or the inclusion of one or more features in this summary section, should not be construed to limit the invention as claimed.

BRIEF DESCRIPTION OF THE DRAWINGS

The foregoing summary, as well as the following detailed description of certain embodiments of the application, will be better understood when read in conjunction with the appended drawings. For the purposes of illustrating the systems and methods of the present application, there are shown in the drawings preferred embodiments. It should be understood, however, that the application is not limited to the precise arrangements and instrumentalities shown. In the drawings.

DETAILED DESCRIPTION

Figure 1:
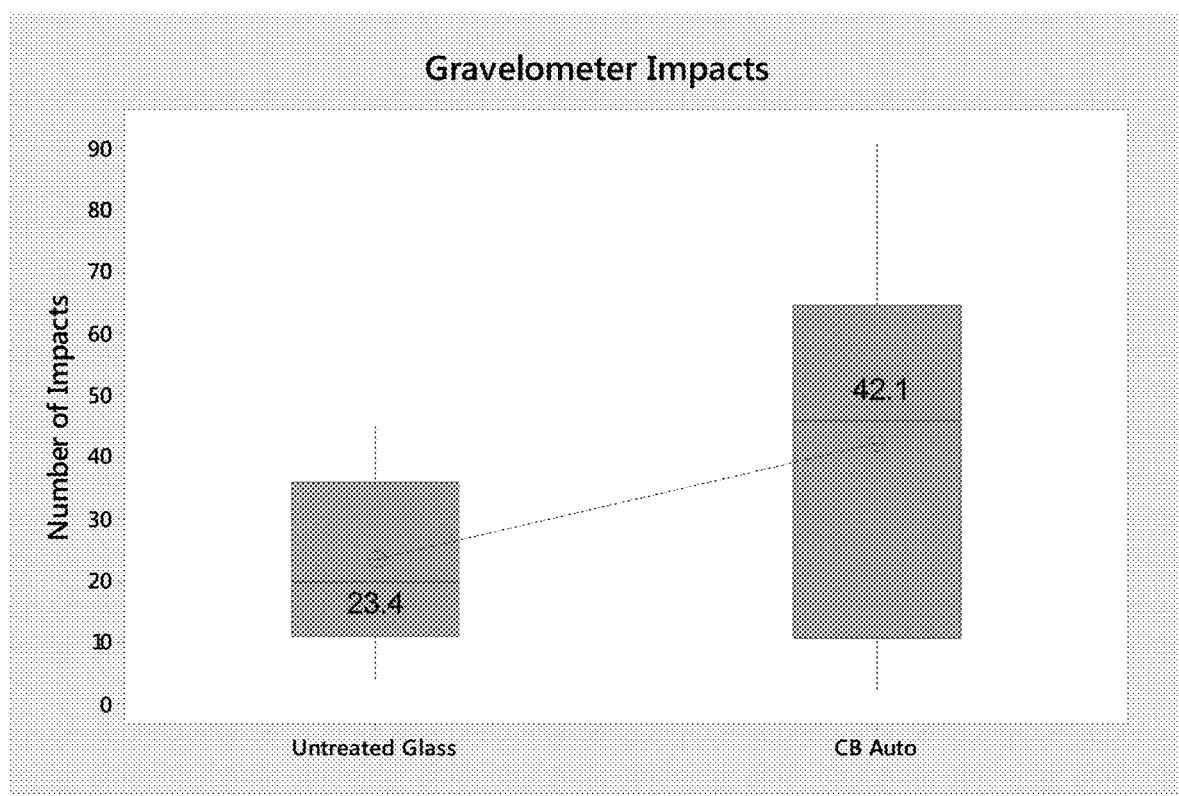
FIG. 1 is a boxplot of the number of impacts to failure for 17 untreated glass samples and 17 glass samples treated with the solution described in Example 1, tested as described in Example 13.

Glass is potentially very strong; however, in sheet form the strength is reduced by the presence of invisibly small defects, known as Griffith cracks, which cause stress concentrations allowing cracks to propagate. Such defects can dramatically degrade glass quality. Strength may be reduced further by larger visible defects. The potential causes of breakage of annealed glass include uniform load, impact, edge damage, poor glazing, site damage, and thermal stress. These factors may also cause breakage of toughened glass, but the failure loads will be higher.

The most significant form of uniform loading on glass is normally wind load, although other causes such as snow may occur in some situations. The safe load on a pane of glass is related to the size of the pane and glass thickness. Glass may break as a result of impact. The impact may be accidental (e.g., from human collision) or deliberate (e.g., from vandalism). Breakage may also be caused by thrown or wind-borne projectiles (e.g., gravel blown from roofs).

Automotive windshields are susceptible to failure due to impact from gravel or other road debris. Cracking of the windshield requires either a repair or replacement of the windshield, depending on the extent of the damage. Increasing the resistance to cracking can lead to a decrease in the number of windshields experiencing any cracking over their lifetime and/or a decrease in the number of windshields experiencing large cracks, allowing for a less expensive repair versus replacement.

Strengthened glass laminates were introduced in the early 1900s and are used today in safety and security glass applications. Impact-resistant glass laminates are used in buildings and in structures, and in automobile glass, for safety and security applications.

Toughened or tempered glass is a type of safety glass processed by controlled thermal or chemical treatments to increase its strength compared with normal glass. Tempering puts the outer surfaces into compression and the inner surfaces into tension. Such stresses cause the glass, when broken, to crumble into small granular chunks instead of splintering into jagged shards as plate glass (annealed glass) creates. The granular chunks are less likely to cause injury.

Toughened glass can be made from annealed glass via a thermal tempering process. The glass is placed onto a roller table, taking it through a furnace that heats it well above its transition temperature of 564° C. (1,047° F.) to around 620° C. (1,148° F.). The glass is then rapidly cooled with forced air drafts while the inner portion remains free to flow for a short time. An alternative chemical toughening process involves forcing a surface layer of glass at least 0.01 mm thick into compression by ion exchange of the sodium ions in the glass surface with potassium ions (which are 30% larger), by immersion of the glass into a bath of molten potassium nitrate. Chemical toughening results in increased toughness compared with thermal toughening and can be applied to glass objects of complex shapes.

Chemically-strengthened glass is a type of glass that has increased strength as a result of post-production chemical processing. When broken, it still shatters in long pointed splinters similar to float glass. However, chemically-strengthened glass is typically six to eight times the strength of float glass. The glass is chemically strengthened by a surface finishing process, in which the glass is submersed in a bath containing a potassium salt (typically potassium nitrate) at 300° C. (572° F.). This causes sodium ions in the glass surface to be replaced by potassium ions from the bath solution. These potassium ions are larger than the sodium ions and therefore wedge into the gaps left by the smaller sodium ions when they migrate to the potassium nitrate solution. This replacement of ions causes the surface of the glass to be in a state of compression and the core in compensating tension. The surface compression of chemically-strengthened glass may reach up to 690 MPa.

There also exists a more advanced, two-stage process for making chemically-strengthened glass, in which the glass article is first immersed in a sodium nitrate bath at 450° C. (842° F.), which enriches the surface with sodium ions. This leaves more sodium ions on the glass for the immersion in potassium nitrate to replace with potassium ions. In this way, the use of a sodium nitrate bath increases the potential for surface compression in the finished article.

Chemical strengthening results in a strengthening similar to toughened glass. However, the process does not use extreme variations of temperature and therefore chemically-strengthened glass has little or no bow or warp, optical distortion, or strain pattern. This differs from toughened glass, in which slender pieces can be significantly bowed. Unlike toughened glass, chemically-strengthened glass may be cut after strengthening, but loses its added strength within the region of approximately 20 mm of the cut. Similarly, when the surface of chemically-strengthened glass is deeply scratched, this area loses its additional strength.

Both chemical and thermal strengthening processing must be performed on the as-prepared glass pane. Once glass is installed, no in-situ treatment is possible.

Impact-resistant glass laminates have been constructed using alternating layers of glass and materials, such as plastic sheeting with adhesive interlays. Some known bullet-resistant glass is made with several glass sheets connected together with polyvinyl butyral (PVB) sheets and with a polycarbonate layer bonded on an inside face of the final glass sheet using a thermoplastics polyurethane layer. The polycarbonate layer provides additional strength (and, to a small degree, elasticity) to the glass upon impact, and provides resistance to spalling. However, alternating layers of glass and plastic can be cumbersome due to their size and weight.

Some innovations in safety and security glass laminates have focused on improving performance (i.e., impact resistance) while making glass laminates more lightweight, less bulky, and less expensive to produce in mass quantities.

Some known glass laminates have a polyester film, such as Mylar® film, applied to a single glass sheet to increase overall strength and bullet resistance of the glass. The polyester film is usually pre-coated with an adhesive, such as an acrylic resin, which permits the polyester film to be bonded to one side of a glass sheet by applying a mild pressure.

It is desirable to be able to strengthen glass at any time, from glass production to post-installation. Furthermore, it is desirable to strengthen the glass without the addition of laminate layers. Potential applications include strengthening automotive glass, household glass, and commercial glass.

A number of methods to strengthen glass have been disclosed. For example, prior methods involve exposing a selected area of the glass article to a beam of electromagnetic radiation in order to diffuse first alkali metal ions in the selected area out of the glass article and to diffuse second alkali metal ions on a surface of the glass article and in the selected area into the glass article. The second alkali metal ions are larger than the first alkali metal ions.

Techniques for surface modification of solids may be chemical, for example, by grafting fluoro, amine, or hydroxyl groups to the surface. They may be physical, for example, by roughening the surface or applying a physical barrier, such as a wax, UV, or anti-oxidation coating. Surface modification techniques may also be thermal, such as plasma cleaning for integrated circuits.

Multiple methods for imparting scratch resistance to glass surfaces have been disclosed. For example, methods of applying sol gel coatings to form oxide surfaces have been used to impart hydrophobicity or scratch resistance. These coatings can be deposited by many different methods, such as physical vapor deposition, adding texture to the surface, or chemically treating the surface, among others.

However, none of the existing methods provide a one-step application for both glass strengthening and glass surface modification.

The present invention overcomes the problems and shortcomings identified in the art, and provides, in various embodiments, a single composition and one-step method of strengthening glass without heat or chemical processing of the glass itself, while also modifying the surface for improved surface properties. The method involves treating the surface of the glass with a multi-component suspension, also referred to herein as a colloidal solution or simply colloid. One component of the colloid is designed to infiltrate the cracks and micro defects in the surface of the glass, while another modifies the surface characteristics of the glass.

A composition of the present invention is a single or multi-component colloid that includes at least one glass-strengthening component and at least one surface-modification component in a solvent. In some embodiments, the glass-strengthening component comprises a strengthening emulsion of colloidal particles comprising an organo-silicon compound, a polyol, and a dispersible polymer. In some embodiments, the surface-modification component comprises an additive that is compatible in miscibility and stability with the solvent. The surface modifier may or may not interact with the glass strengthener. The composition may, optionally, also contain carboxylic acids, surfactants, dispersants, rheology modifiers, emulsifiers and/or emulsion stabilizers, and nanoparticles.

The strengthening emulsion comprises particles whose sizes are smaller or comparable to the cracks and defects on the glass. The strengthening of the glass occurs due to the filling in of the cracks and defects. The colloidal particles efficiently fill the cracks and micro defects in the glass due to their appropriate size, rather than layer by layer as would occur with a non-colloidal treatment or a similar chemical composition that is not a colloid. Furthermore, the reactive nature of the surface of the preformed colloidal particles means that the reaction with the surface of the crack or defect is more efficient.

A polymer is a large molecule, or macromolecule, composed of many repeated subunits. In the present invention, a dispersible polymer is a polymer that may be dispersed into a solvent to create a colloidal suspension. Examples of dispersible polymers useful in the present invention include, but are not limited to, polypropylene glycol, vinyl acetate-ethylene and vinyl acetate-vinyl chloride-ethylene, and acrylic polymers such as, but not limited to, poly(methyl methacrylate), sodium polyacrylate, and polyacrylamide. In some embodiments, the dispersible polymer comprises at least one of an acrylic polymer, an epoxy polymer, a urethane polymer or a polysulfide, a polyether siloxane, and an aliphatic polyester (e.g., an anionic aliphatic polyester).

Organo-silicon compounds are compounds containing carbon-silicon bonds. They may also contain silicon to oxygen bonds, in which case they are also known as silicones. Examples of organo-silicon compounds useful in the present invention include, but are not limited to, (3,3-dimethylbutyl)triethoxysilane, (3-glycidoxypropyl)trimethoxysilane, 1,2-bis(methyldiethoxysilyl)ethane, and N-(2-aminoethyl)-3-aminopropylsilanetriol. In some embodiments, the organo-silicon compound is a bi-functional organo-silicon compound.

A polyol is an alcohol containing multiple hydroxyl groups. Examples of polyols useful in the present invention include, but are not limited to, glycerin (also referred to herein as glycerol), pentaerythritol, ethylene glycol, and sucrose. The function of the polyol is to stabilize the organo-silicon/polymer colloid. A further function of the polyol may be to bind the polymer colloid particles to each other during the cure process, or to aid in the evaporation process.

The surface modifier may or may not be part of the strengthening emulsion. The surface modifier may add additional properties such as hydrophobicity, hydrophilicity, improved scratch resistance, improved transparency, or any combination of these. In some embodiments, the surface modifier comprises at least one of a water-soluble wax, a branched alkyl-silane, a fluorinated branched alkyl-silane, a linear alkyl-silane, a dipodal silane, and a methyl-silane.

The process of the invention involves the infiltration of polymer colloid particles into the cracks and defects within the glass surface by capillary action. Once these polymer colloid particles are in place, the silane functionality enables their reaction with the surface of the defect of the glass. Thus, during the cure process the solvent is evaporated and the resulting colloid polymer particles react with the surface of the glass, both physically filling the crack or defect and also providing chemical bonding.

In the present invention, the term cure is used to denote a process of evaporation of solvent and binding of the colloid particles to the interior of the defects within the glass surface. Cure is not intended to designate a process whereby a material hardens from a liquid or particulate state to a solid with inherent strength such as observed for resins and adhesives.

A colloid is a mixture or colloidal suspension in which one substance of microscopically-dispersed insoluble particles is suspended throughout another substance. It is not necessary for the insoluble particles to be of a solid. Sometimes the dispersed substance alone is called the colloid; the term colloidal suspension refers to the overall mixture. Unlike a solution, whose solute and solvent constitute only one phase, a colloid has a dispersed phase (the suspended particles) and a continuous phase (the medium of suspension). A colloidal suspension is sometimes referred to as a colloidal solution. Herein, the terms colloidal suspension and colloidal solution are considered synonymous.

The nanomaterials in compositions according to the present invention may be any suitable known nanoparticle or aggregate of nanoparticles or mixture of nanoparticles that provide the desired physical, chemical, or biochemical activity. The nanoparticles may include, but are not limited to, a metal, a metal oxide, a metal chalcogenide, semiconductor quantum dots, polymers, carbon nanomaterials, whiskers, cellulose, boron nitride, graphites, and nanofibers. Metal nanoparticles can include, but are not limited to, copper, silver, or other bioactive metals. Metal oxide nanoparticles can include, but are not limited to, iron oxide, aluminum oxide, zinc oxide, titanium dioxide, silicon dioxide, manganese oxide, a clay mineral, or other natural silicate or aluminate. Polymer nanoparticles can include, but are not limited to, boron nitride, natural or synthetic polymer beads or particles, or micelles. Carbon nanoparticles can include, but are not limited to, graphene, nano-graphite, nano-coal, single-walled carbon nanotubes, multi-walled carbon nanotubes, vapor grown fibers, nano-cones, and whiskers.

The disclosure herein refers primarily to glass surfaces, but the present invention can be applied to a wide variety of brittle materials. Compositions of the present invention can be used for treating predominately dense materials such as, but not limited to, dense ceramics, porcelain, paint, and glass (e.g., flat glass, bottling, display glass, and architectural glass); and for treating porous materials, such as, but not limited to, laminates, multi-layer laminates, glass laminates, and materials for enhancing the lamination of multiple layers of materials or panes of glass (e.g., glass laminates, for use in safety and security applications). In some embodiments, the solution can be applied to the exterior surface of automotive windshields to increase the fracture toughness of the glass and to improve visibility. In other embodiments, the solution can be applied to the exterior surface of architectural glass to increase the fracture toughness of the glass and to improve the self-cleaning characteristics of the glass. In further embodiments, the solution can be applied to the exterior surface of electronics glass or display to increase both the impact toughness and the scratch resistance of the glass. The present invention may also be used in other applications, known or later-developed, as will be recognized by those skilled in the art.

A summary of the Examples described below, and the effects of various composition and process changes made in the Examples, is given in Table 1.

TABLE 1

| Example | Composition/process changes as compared to baseline solution | Improvement over untreated | Contact Angle | Comment |
| --- | --- | --- | --- | --- |
|  | Untreated glass |  | 46.4° | Contact angle on glass without treatment |
| 1 | Baseline solution with (3,3-dimethylbutyl)triethoxysilane | 10.1% | 53.9° | Hydrophobicity induced with no negative impact on strength |
| 2 | Baseline solution with no surface modifier | 14.8% | 47.0° | Strengthening but no surface modification |
| 3 | Baseline solution with 3-(heptafluoroisopropoxy)propyltrimethoxysilane | 38.3% | 92.1° | Strengthening and hydrophobic |
| 4 | Baseline solution with 10-undecenyltrimethoxysilane | 14.0% | 60.3° | Hydrophobicity induced with no negative impact on strength |
| 5 | Baseline solution with 1,2-bis(methyldiethoxysilyl)ethane | 15.9% | 62.7° | Strengthening and hydrophobic |
| 6 | Baseline solution with 2-[methoxy(polyethyleneoxy)6-9propyl]trimethoxysilane, tech-90 | 6.8% | 55.8° | No impact |
| 7 | Baseline solution with AQUACER 497 | 11.8% | 63.9° | Hydrophobicity not induced with no negative impact on strength |
| 8 | Baseline solution with N-(2-aminoethyl)-3-aminopropylsilanetriol | 11.6% | 53.8° | Hydrophobicity not induced with no negative impact on strength |
| 9 | Baseline solution with (3,3-dimethylbutyl)trichlorosilane | 10.1% | 61.9° | Hydrophobicity induced with no negative impact on strength |
| 10 | Baseline solution with bis[(3-methyldimethoxysilyl)propyl]polypropylene oxide | 16.3% | 62.7° | Hydrophilicity induced with no negative impact on strength |
| 11 | Baseline solution with BEETAFIN ® 2800 | 13.8% | N/A | Scratch-resistant coating with no negative impact on strength |
| 12 | Baseline solution with TEGOPREN ® 5840 | 20.7% | N/A | Improved finish with positive impact on strength |

TABLE 1-continued

| Example | Composition/process changes as compared to baseline solution | Improvement over untreated | Contact Angle | Comment |
| --- | --- | --- | --- | --- |
| 13 | Baseline solution with (3,3-dimethylbutyl)triethoxysilane | 14.7% | 53.9° | Gravelometer testing |
| 14 | Baseline solution with nonafluorohexyltriethoxysilane | 11.7% | 88.2° | Hydrophobicity induced with no negative impact on strength |

Concentration of the active ingredients in the strengthening emulsion may be varied. The composition of the present invention can comprise at least 51% water, but preferably greater than 85% water. The relative ratio of organo-silicon to polyol may be varied such that the molar ratio of organo-silicon to polyol is greater than 1:3, but no more than 5:1.

Concentration of the surface modifier in the composition may be varied in order to provide exemplary surface modification performance. The composition can comprise less than or equal to 15% surface modifier, but preferably less than 5%. In Examples 1 and 3-11, the surface modifier content was held constant at 10 millimoles for comparison.

The surface modifier may or may not interact chemically with the strengthening emulsion. The surface modifier may combine with the primary emulsion, form a secondary emulsion, or dissolve completely in the solvent. Upon application, the surface modifier may or may not react with the substrate chemically, physically, or electrically. The surface modifier may be alcohol, oil, or water based.

The composition was designed to yield significantly improved surface behavior and glass fracture toughness. The glass fracture toughness was evaluated by ring on ring testing following ASTM C1499. In some embodiments, the strength of the glass is increased by at least 10% relative to untreated glass, as measured by a ring on ring testing according to ASTM C1499. In some embodiments, the surface property altered is the hydrophobicity, as measured by an increased water droplet contact angle greater than 50°. In some embodiments, the surface property altered is the scratch resistance, as measured by an increased Scratch Hardness Number.

Additional testing was developed to more appropriately evaluate automotive windshield performance in the field. Due to the transparent nature of glass and an exemplary composition of the present invention (C-Bond Auto), evaluation by the SAE Chip Rating Standards was not feasible. The modification to the SAE J400 method involved decreasing the air supply pressure from 70 psi to 30 psi and changing the glass angle from perpendicular to the gravelometer to angled 30 degrees from vertical. The change in angle was to model the angle of an actual passenger car windshield. The decrease in pressure was to generate less severe damage to the glass panels, thereby allowing comparison of the damage between untreated and treated glass. Although improved over the original method, this method was still not satisfactory. When a crack is generated by a piece of gravel and then subsequently impacted by many other pieces of gravel, the nature of the damage is such that the initial damage cannot be identified. Additionally, many of the cracks and chips run together and quantifying the number of failure sites is not feasible. This method also did not model a typical failure mechanism of an actual windshield, which usually involves an impact from a single piece of gravel. Preferably, the method should provide a way to quantify the ability of a windshield to resist the first crack(s) that would require repair or replacement. The modified method is detailed in Example 13. In some embodiments, the impact resistance is increased by at least 30% as measured by the mean number of impacts to failure by a gravelometer at 30 psi on glass set at 30° from vertical.

In some embodiments, a composition according to the present invention is coated onto a layer of glass, onto one or both surfaces of the glass, and/or onto surfaces of multiple layers of glass that are then combined one onto the other, with coating between adjacent layers. Excess coating material may be removed. In certain embodiments, sufficient material is used so that material penetrates pores of a layer of material (such as, but not limited to, pores in a pane or layer of glass) and remains in and/or fills the pores. In certain embodiments, the coating after drying is between about 0.01 microns and about 10 microns thick.

In other embodiments, a multi-layer glass structure is produced in which any surface or surfaces of any particular glass layer has a coating of a composition according to the present invention, and, in one particular embodiment, there is a coating of the composition between each two adjacent glass layers, with or without such a coating on one or both outermost surfaces of the structure. In any such embodiment, sufficient composition material may be used so that pores of the material are filled in.

EXAMPLES

Example 1

In Step 1, 1 gallon (3.785 L) of distilled water was stirred at a stirring speed of 8 for 2 minutes until a vortex formed and stabilized. To this, 0.63 g of benzoic acid was added as a preservative. The solution was stirred for an additional 3 hours to ensure complete dissolution of the preservative. In Step 2, 15 mL of glycerol was added to the solution while stirring at a stir setting of 7. The solution with glycerol addition was stirred for 5 minutes to allow the glycerol to completely dissolve. 125 mL of (3-glycidoxypropyl)trimethoxysilane (GPTMS) was then added to the solution, also while stirring at a stir setting of 7. The solution was again allowed to stir for an additional 5 minutes in order to fully dissolve the GPTMS. The stirrer was then stopped and the solution was allowed to stand. After a hold, the stirrer was restarted to a stir setting of 6.5. In Step 3, the solution was stirred for 2 minutes to allow a vortex to form and stabilize. 2 mL of isopropyl alcohol was added to the solution and stirred for 2 minutes to fully dissolve. Next, 0.32 g of acrylic polymer, RHOPLEX™ EC-1791, was added to the solution while stirring. The solution was allowed to stir an additional 5 minutes at a stir setting of 7. The solution was allowed to stand again, forming the baseline solution referenced in Table 1. Finally, 16 mL of (3,3-dimethylbutyl)triethoxysilane was added to the solution as a surface modifier. (3,3-dimethylbutyl)triethoxysilane is a branched alkyl-silane that imparts hydrophobic properties to the surface. The solution was again allowed to stand. Upon completion of this step, the solution was packaged and considered ready for testing.

Testing for strength behavior was performed by ring on ring strength testing. 3"×3" soda-lime float glass samples from Stemmerich, Inc. were sprayed with solution on one side of the glass and allowed to dry. To speed up complete drying, samples were placed in a drying oven at 275° F. for 180 minutes. Once the samples were dried, they were removed from the drying oven and allowed to return to room temperature. For ring on ring testing, the dimensions of each sample were measured and entered into MTESTQuattro® software. The samples were then mounted on silicone pads and covered with Teflon® adhesive tape from Saint-Gobain. The pads and the tape protect the equipment from scratching, eliminate contact stresses and friction between the rings and glass, and keep the broken glass from flying off when the sample shatters, which also allows for fractographic examination of the sample. The equibiaxial failure strength was determined for untreated glass to be 193.0 MPa with a standard deviation of 72.4 MPa. The contact angle of untreated glass was measured to be 24.0°. Glass coated with the solution prepared in Example 1 failed at 212.5 MPa with a standard deviation of 29.4 MPa. This represents a 10.1% improvement over the untreated glass. The contact angle of glass coated with the solution prepared in Example 1 was measured to be 53.9°.

Example 2

In this embodiment, a solution was prepared as in Example 1, except that no surface modifier was added. All stirring times remained the same. The solution prepared in Example 2 failed at 221.5 MPa, for an improvement over untreated of 14.8%. The contact angle was measured to be 47.0°.

Example 3

In this embodiment, a solution was prepared as in Example 1, except that 14.7 mL of 3-(heptafluoroisopropoxy)propyltrimethoxysilane was added as the surface modifier. 3-(heptafluoroisopropoxy)propyltrimethoxysilane is a branched fluorinated alkyl-silane that imparts hydrophobic properties to the surface. This solution mixed well and all hold times were held constant. The solution prepared in Example 3 failed at 267.0 MPa, for an improvement over untreated of 38.3%. The contact angle was measured to be 92.1°.

Example 4

In this embodiment, a solution was prepared as in Example 1, except that 17.7 mL of 10-undecenyltrimethoxysilane was added as the surface modifier. 10-undecenyltrimethoxysilane is a linear alkyl-silane that imparts hydrophobic properties to the surface. This solution mixed well and all hold times were held constant. The solution prepared in Example 4 failed at 220.1 MPa, for an improvement over untreated of 14.0%. The contact angle was measured to be 60.3°.

Example 5

In this embodiment, a solution was prepared as in Example 1, except that 18.7 mL of 1,2-bis(methyldiethoxysilyl)ethane was added as the surface modifier. 1,2-bis(methyldiethoxysilyl)ethane is an aliphatic dipodal silane that imparts hydrophobic properties to the surface. This solution mixed well and all hold times were held constant. The solution prepared in Example 5 failed at 223.7 MPa, for an improvement over untreated of 15.9%. The contact angle was measured to be 62.7°.

Example 6

In this embodiment, a solution was prepared as in Example 1, except that 27.9 mL of 2-[methoxy(polyethyleneoxy)6-9propyl]trimethoxysilane, tech-90 was added as the surface modifier. 2-[methoxy(polyethyleneoxy)6-9propyl]trimethoxysilane, tech-90 is a methyl-silane that imparts hydrophobic properties to the surface. This solution mixed well and all hold times were held constant. The solution prepared in Example 6 failed at 206.2 MPa, for an improvement over untreated of 6.8%. The contact angle was measured to be 55.8°.

Example 7

In this embodiment, a solution was prepared as in Example 1, except that 75.7 mL of BYK ACQUACER 497 was added as the surface modifier. ACQUACER 497 is a paraffin wax emulsion that imparts hydrophobic properties to the surface. This solution mixed well and all hold times were held constant. The solution prepared in Example 7 failed at 215.8 MPa, for an improvement over untreated of 11.8%. The contact angle was measured to be 63.9°.

Example 8

In this embodiment, a solution was prepared as in Example 1, except that 10.5 mL of N-(2-aminoethyl)-3-aminopropylsilanetriol was added as the surface modifier. N-(2-aminoethyl)-3-aminopropylsilanetriol is a hydrogen-bonding silane that imparts hydrophilic properties to the surface. This solution mixed well and all hold times were held constant. The solution prepared in Example 8 failed at 215.4 MPa, for an improvement over untreated of 11.6%. The contact angle was measured to be 53.8°.

Example 9

In this embodiment, a solution was prepared as in Example 1, except that 11.4 mL of (3,3-dimethylbutyl)trichlorosilane was added as the surface modifier. (3,3-dimethylbutyl)trichlorosilane branched alkyl-silane that imparts hydrophobic properties to the surface. This solution mixed well and all hold times were held constant. The solution prepared in Example 9 failed at 212.5 MPa, for an improvement over untreated of 10.1%. The contact angle was measured to be 61.9°.

Example 10

In this embodiment, a solution was prepared as in Example 1, except that 40.9 mL of bis[(3-methyldimethoxysilyl)propyl]polypropylene oxide was added as the surface modifier. Bis[(3-methyldimethoxysilyl)propyl]polypropylene oxide is a dipodal silane that imparts hydrophilic properties to the surface. This solution mixed poorly and was stirred an extra 30 minutes to promote dissolution of the surface modifier. The solution prepared in Example 10 failed at 224.5 MPa, for an improvement over untreated of 16.3%. The contact angle was measured to be 62.7°.

Example 11

In this embodiment, a solution was prepared as in Example 1, except that 49.9 mL of BEETAFIN® 2800 was added as the surface modifier. BEETAFIN® 2800 is an anionic aliphatic polyester that imparts scratch resistant properties to the surface. This solution mixed well and all hold times were held constant. The solution prepared in Example 11 failed at 221.8 MPa, for an improvement over untreated of 14.9%. The contact angle was not measured. The scratch resistant coating was evaluated by drawing a stylus-type test pen fitted with a 0.5 mm diameter tungsten carbide tip in a linear motion across the surface. The force on the tip was constant and normal to the surface, with the known force generated by a calibrated spring. A series of tests were performed across the piece with the force increased in increments of 3 N. A reference sample was first created using this procedure on untreated soda lime float glass. The procedure was then repeated on soda lime float glass treated with the solution of Example 11. A visual inspection of the surface at each load was performed. A visible scratch on the surface indicated a failure. Comparing the minimum load required to produce a visible scratch on each sample provided a quantitative measure of the increase in scratch resistance imparted to the glass surface by the solution. Evaluation of the surface at all test loads also provided a qualitative measure of the resistance to severe damage at higher loads. For untreated glass, a noticeable scratch was evident at a load of 12 N. For the treated sample prepared in Example 11, a noticeable scratch was evident at 30 N.

Example 12

Figure 2A:
FIG. 2A is an image of a typical glass bottle sprayed with the glass-strengthening solution described in Example 2.
Figure 2B:
FIG. 2B is an image of a typical glass bottle sprayed with the multipurpose solution described in Example 12.

In this embodiment, a solution was prepared as in Example 1, except that 12 mL of TEGOPREN® 5840 was added to the solution. TEGOPREN® 5840 is a polyether-modified trisiloxane that induces improved wetting behavior of the solution. This solution mixed well and was stirred for 15 minutes after the introduction of the wetting agent. For this solution, a different set of glass was used. The equibiaxial failure strength for this set of glass, untreated, was 158.1 MPa. The solution prepared in Example 12 failed at 190.8 MPa, for an improvement over untreated of 20.7%. The transparency of the finished glass was much improved, as shown in FIG. 2B. In FIG. 2A, spots are visible and the finish is not clear. In FIG. 2B, the surface finish is much improved.

Example 13

In this embodiment, a solution was prepared as in Example 1. This solution is also referred to herein as C-Bond Auto, or CB Auto. The solution was sprayed on laminated glass and tested to simulate automotive windshields. Flat, laminated, soda lime silicate glass panels, 12"×4", were purchased from Tri-Valley Auto Glass, an automotive glass fabricator. The 12"×4" panels were hand cut from larger sheets of laminated clear, automotive quality glass, with the makeup of 2.5 mm glass/0.76 mm PVB/2.5 mm glass. The edges were seamed for safety.

Example 14

In this embodiment, a solution was prepared as in Example 1, except that 24 mL of nonafluorohexyltriethoxysilane was added as the surface modifier. Nonafluorohexyltriethoxysilane is a branched alkyl-silane that imparts hydrophobic properties to the surface. This solution mixed well and all hold times were held constant. The solution prepared in Example 14 failed at 215.6 MPa, for an improvement over untreated of 11.7%. The contact angle was measured to be 88.2°.

Half of the glass panels were treated with C-Bond Auto and half remained untreated as control samples. The treated samples were cleaned with isopropyl alcohol and allowed to dry for 1 hour. They were then sprayed with C-Bond Auto solution on one side, squeegeed and stored vertically to air dry for 24 hours. The panels were dried in an oven at 250° F. for 90 minutes to cure the solution. The control samples were cleaned with isopropyl alcohol and allowed to dry. After allowing the treated samples to equilibrate with ambient temperature conditions, all samples were securely packaged using Kraft neutral interleaving paper between glass panels and shipped to Assured Testing Services (ATS) for third-party gravelometer testing.

Seventeen (17) control samples and seventeen (17) samples treated with C-Bond Auto were tested at ATS using the modified gravelometer impact method with a single piece of gravel at a time. For treated samples, the side treated with C-Bond Auto was the impacted side.

All laminated glass panels were tested until failure, and the number of impacts required to produce a chip or crack was recorded. Statistics of gravelometer impact testing of the laminated glass (mean, median, standard deviation, and coefficient of variation) are given in Table 2.

TABLE 2

| Treatment | Mean | Median | Standard Deviation | Coefficient of Variation |
|---|---|---|---|---|
| Control | 23.4 | 20.0 | 13.7 | 58.5% |
| C-Bond Auto | 42.1 | 46.0 | 29.7 | 70.7% |

The samples treated with C-Bond Auto exhibited an 80% increase in the mean number of impacts to failure and a 130% increase in the median number of impacts to failure. This improvement in gravelometer impact resistance was statistically significant at a 95% confidence interval. A boxplot of the data is provided in FIG. 1.

The modified method described herein involves impacting the glass panels with a single piece of gravel at a time instead of pouring 300+ pieces of gravel into the gravelometer at one time. The air supply pressure is set at 30 psi and the angle is 30 degrees from vertical. The glass panels are inspected for damage after each impact. The test is ceased at the first observable chip or crack. The number of gravel impacts required for failure is noted for each panel.

While there have been shown and described fundamental novel features of the invention as applied to the illustrative embodiments thereof, it will be understood that omissions and substitutions and changes in the form and details of the disclosed invention may be made by those skilled in the art without departing from the spirit of the invention. Moreover, as is readily apparent, numerous modifications and changes may readily occur to those skilled in the art. Hence, it is not desired to limit the invention to the exact construction and operation shown and described and, accordingly, all suitable modification equivalents may be resorted to falling within the scope of the invention as claimed. It is the intention, therefore, to be limited only as indicated by the scope of the claims appended hereto.

What is claimed is:

1. A multifunctional composition for modifying one or more surface properties and increasing strength of a glass substrate, the multifunctional composition comprising: a glass-strengthening component; a surface-modification component; and an aqueous solvent, the glass-strengthening component comprising an organo-silicon/polymer colloid and at least one polyol, and the surface-modification component comprising at least one of (3,3-dimethylbutyl)triethoxysilane, 3-(heptafluoroisopropoxy)propyltrimethoxysilane, 10-undecenyltrimethoxysilane, 1,2-bis(methyldiethoxysilyl)ethane, (3,3-dimethylbutyl)trichlorosilane, bis[(3-methyldimethoxysilyl)propyl]polypropylene oxide, an anionic aliphatic polyester, a polyether-modified trisiloxane, and nonafluorohexyltriethoxysilane, wherein the multifunctional composition is formulated for one-step application to the glass substrate at room temperature and pressure, and wherein the multifunctional composition, when applied to the glass substrate, provides at least 10% improvement in the strength of the glass substrate as compared to untreated glass, as measured by ring on ring strength testing according to ASTM C1499.

2. The multifunctional composition of claim 1, wherein the organo-silicon/polymer colloid comprises a bi-functional organo-silicon compound.

3. The multifunctional composition of claim 2, wherein the organo-silicon/polymer colloid comprises (3-glycidoxypropyl)trimethoxysilane.

4. The multifunctional composition of claim 1, wherein the organo-silicon/polymer colloid comprises an acrylic polymer.

5. The multifunctional composition of claim 1, wherein the at least one polyol comprises at least one of glycerol, pentaerythritol, ethylene glycol, and sucrose.

6. The multifunctional composition of claim 1, wherein the one or more surface properties of the glass substrate comprise at least one of hydrophobicity and scratch resistance.

* * * * *